Patented June 16, 1942

2,286,317

UNITED STATES PATENT OFFICE 2,286,317

DYE

Edmund Stanley, George Holland Ellis, and Henry Charles Olpin, Spondon, near Derby, England, assignors to Celanese Corporation of America, a corporation of Delaware No Drawing. Application December 20, 1939, Serial No. 310,178. In Great Britain December 30, 1938

9 Claims. (Cl. 8—48)

This invention relates to coloured cellulose ester or ether materials.

The present invention comprises cellulose acetate and other cellulose ester or ether textile materials, straws, foils, and the like, coloured with the azo dyes obtained by coupling diazotised amino azo compounds of the general formula:

$$R_1—N=N—R_2—NH_2$$

with phenolic coupling components of the general formula $$R_3—OH$$

$R_2$ being a benzene or naphthalene radicle, preferably a benzene radicle, and $R_1$ and $R_3$ being radicles of the benzene or naphthalene series at least one of which is a radicle comprising two aryl nuclei united by a single linkage, and preferably a diphenyl radicle. Each of the radicles, $R_1$, $R_2$ and $R_3$ is advantageously of the benzene series. The dyes are, therefore, of the general formula $$R_1—N=N—R_2—N=N—R_3.OH$$

wherein $R_1$, $R_2$ and $R_3$ have the meaning indicated above.

The new products can be produced by forming the above mentioned dyes on cellulose ester or ether materials by the coupling thereon of the above mentioned diazotised amino azo compounds with the above mentioned phenolic coupling components. Again they can be produced by shaping into the required form and setting cellulose ester or ether solution containing the already prepared azo dyes. For example coloured filaments may be produced by dry spinning cellulose ester or ether solutions containing the dyes. In this way there can be obtained cellulose ester or ether products coloured in valuable yellow to orange shades which are of excellent fastness to water, that is, there is very little tendency to transfer of colour when the coloured material is attached to uncoloured material and immersed in water. Moreover the colourations are of very good fastness to light. In the past it has been found very difficult to produce on cellulose ester or ether textile materials yellow to orange shades of good fastness both to light and to water.

If desired the amino azo compound and/or the phenolic coupling component may contain other substituents. As examples of such substituents may be mentioned acidyl amino groups e. g. the acetyl amino group, alkyl groups e. g. methyl, and alkoxy groups, e. g. methoxy and ethoxy. The components employed for the production of the dyes should, however, be such that the products are free from acid groups such as the sulphonic acid group and the carboxylic group. Further, they are preferably such that the dyes are free from salt-forming auxochrome groups other than the single hydroxy group in the residue $R_3$. Moreover the components are preferably such that the resulting dyes are free from chromophores other than the two azo groups.

In the radicle consisting of two aryl groups united by a single linkage, the latter may be a direct link as in diphenyl itself or 1:1'-phenyl-naphthyl, or linkage through oxygen, sulphur, carbon, —CO—NH— or —NH—CO—NH— as in diphenyl ether, diphenyl-sulphide, diphenyl-methane, diphenyl-dimethyl-methane, N-benzoylaniline and diphenylurea.

As examples of amino azo compounds containing the diphenyl nucleus and suitable for use as diazo components mention may be made of the amino azo compounds obtainable by coupling diazotised amino diphenyls with primary aromatic amines which couple with diazo compounds in para-position to the primary amino group, for example, m-toluidine, p-xylidine, 3-amino-4-methoxy-1-methyl-benzene, 2:5-dimethoxyaniline, mono-acetyl-m-phenylene-diamine, α-naphthylamine, and 1-amino-2-naphthol ethyl ether. Primary amines which do not couple readily with diazo compounds in para-position to the primary amino groups, e. g. aniline and ortho-toluidine can be coupled in the form of their formaldehyde bisulphite compounds, the formaldehyde bisulphite residues being eliminated after coupling. Amino diphenyls which are suitable for diazotisation and coupling with these middle components are 4-amino-diphenyl, 3-nitro-4-amino-diphenyl, 4'-chlor-4-amino-3-nitro-diphenyl, mono-acetyl benzidine, monoacetyl tolidine and mono-acetyl dianisidine.

Other suitable amino azo compounds of the formula $R_1—N=N—R_2—NH_2$ in which $R_1$ comprises two aryl nuclei united by a single linkage are those obtainable by coupling a p-coupling primary amine (e. g. one of those mentioned above) with diazotised monobenzoyl-p-phenylene diamine, p-amino-diphenyl-ether, mono-acetyl-4:4'-diamino-diphenylmethane, mono-acetyl-4:4'-diamino-diphenyl-dimethyl-methane, and p-amino-diphenylsulphone.

Other amino azo compounds which may be employed as diazo components are p-amino azo benzene, amino azo naphthalene (4-amino-1:1'-azonaphthalene) and their nuclear substitution products, e. g. amino azo toluene (4-amino-2':3-dimethylazo benzene), 4-amino-2:5-dimethoxy-azo-benzene, 4-nitro-4'-amino-2'-methyl-azo-benzene, 4-nitro-4'-amino-2'-methyl-5'-methoxy-azo-benzene and 4-nitro-4'-amino-2'5'-dimethoxy-azo-benzene. Such amino azo compounds as do not contain the diphenyl group are, of course, used in conjunction with a coupling component containing a diphenyl group.

As phenolic coupling components there can be used phenol, cresols, especially para cresol, ortho and p-hydroxy diphenyls, 4-hydroxy-diphenyl-methane, N-benzoyl-p-aminophenol and β-napthol. Those coupling components which do not contain a diphenyl residue are, of course, for use with diazo components containing the diphenyl residue. The coupling components include both phenols which couple in para-position to the phenolic hydroxy group and phenols which couple in ortho-position to the phenolic hydroxy group.

In the following table are given some pairs of components which may be employed for the production of the dyes on cellulose acetate material.

| Diazo component | Phenolic coupling component | Shade |
| --- | --- | --- |
| Amino azo compound from diazotised mono-acetyl benzidine and para-xylidine. | Phenol | Golden orange. |
| Amino azo compound from mono-acetyl benzidine and m-toluidine. | do | Yellow. |
| Do | Ortho-hydroxy-diphenyl | Do. |

The shades so produced on cellulose acetate material are of an excellent fastness to light and to soap scouring.

As regards the procedure to be followed in forming the azo dyes on cellulose acetate or other cellulose ester or ether materials it is preferred first to incorporate the amino azo compound in the material and then to effect diazotisation and coupling with the phenolic coupling component.

The diazo components can be applied to the materials in the form of aqueous dispersions. Bath methods may be employed, that is to say methods in which the materials are allowed to absorb the diazo component from an aqueous dispersion of the latter in which they are immersed. Again, mechanical impregnation methods may be used, the materials being impregnated with a quantity of liquid containing the requisite amount of diazo component. To this end padding or printing methods may be utilised. The impregnated material may then be aged or steamed to cause the diazo component to enter the cellulose ester or ether material.

In general, the dye components utilised in accordance with the invention have substantially no affinity for cellulose textiles, for example, cotton and regenerated cellulose. If, therefore, they are applied to mixed materials containing both cotton or regenerated cellulose and a cellulose ester or ether, the latter alone takes up the diazo component so that on diazotising and developing resist effects on the cellulose component of the material may be obtained. By suitably colouring the cellulose component of such material with dyestuffs resisting the cellulose ester or ether component of the material valuable two colour effects can readily be obtained. The dyestuff for the cellulose component can be applied before or after the development of the azo dye on the cellulose ester or ether material. For example it may be applied before development either together with, or separately from, the diazo component applied to the cellulose ester or ether material. If the dyestuff for the cellulose component is diazotisable it can be diazotised and developed with a suitable coupling component at any convenient stage of the operation. Further, if desired, the phenolic coupling component employed in accordance with the present invention for the formation of an azo dye on the cellulose ester or ether component of the material may simultaneously be used to develop the diazotised dyestuff on the cellulose component of the mixed material.

As indicated above the new dyes can be used for the colouration of cellulose ester or ether materials other than those made from cellulose acetate and examples of such other esters or ethers are cellulose formate, propionate, and butyrate, and methyl, ethyl and benzyl cellulose.

*Example 1*

226 parts of mono-acetylbenzidine are diazotised and coupled with the formaldehyde bisulphite compound obtained from 93 parts of aniline. After splitting off the formaldehyde bisulphite residue by warming with a 2% solution of caustic soda, the amino-mono-azo dye so obtained is diazotised and coupled with 94 parts of phenol dissolved in water containing 40 parts of caustic soda.

0.15 part of the disazo dye so obtained is incorporated with 25 parts of cellulose acetate and 75 parts of acetone, so as to form a spinning solution. This solution is then dry-spun into filaments which are of a bright golden yellow colour of very good fastness to light and wet processing.

*Example 2*

A cellulose acetate knit fabric is dyed with 0.5% of its weight of the amino-mono-azo dye prepared from mono-acetylbenzidine and aniline described in Example 1. The dye is applied from a soap bath and, after rinsing, the material is diazotised in a 30:1 bath prepared with 4 ccs. of concentrated hydrochloric acid and 1 gm. of sodium nitrite per litre. After working cold for 30 minutes the material is rinsed and entered into a coupling bath containing 1% of phenol based on the weight of the cellulose acetate material. Coupling is completed by warming to 70–75° C. There is thus obtained a golden yellow colouration of very good fastness to light and wet processing.

*Example 3*

A cellulose acetate knit fabric is dyed from a soap bath with 1% of its weight of the mono-azo dye obtainable by coupling diazotised mono-acetyl-benzidine with m-toluidine. The material is then diazotised in the manner described in Example 2 and entered into a coupling bath in which has been dispersed, with the aid of soap, 1% of p-hydroxydiphenyl based on the weight of the goods. The material is dyed in a yellow shade of good fastness to light and very good fastness to wet processing.

A similar result is obtained by substituting p-cresol for the p-hydroxydiphenyl.

*Example 4*

Cellulose acetate artificial silk is dyed with 0.5% of its weight of the mono-azo dye obtained by coupling diazotised 1-amino-4-benzoylamino-benzene with the formaldehyde bisulphite compound of aniline and thereafter splitting off the formaldehyde bisulphite residue. The dyed material is then diazotised in the manner described in Example 2 and coupled with 1% of its weight of o-hydroxydiphenyl dispersed in a 30:1 bath. A yellow dyeing is obtained which is fast to light and wet treatment.

Having described our invention what we desire to secure by Letters Patent is:

1. Process for the production of colored cellulose ester or ether materials which comprises forming an azo dye on cellulose ester or ether textile materials, straws, foils or the like, by coupling thereon a diazotized amino azo compound of the general formula $$R_1-N=N-R_2-NH_2$$

with a phenolic coupling component, $R_1$ being a radicle of which the aryl nuclei are selected from those of the benzene and naphthalene series and which consists of two of the said nuclei united by a single linkage, $R_2$ being a member of the group consisting of benzene and naphthalene radicles, and the phenolic coupling component being selected from the group consisting of mononuclear phenols, hydroxy-diphenyls and hydroxy-diphenylmethanes.

2. Process for the colouration of cellulose ester or ether textile materials, straws, foils or the like, which comprises impregnating the material with an amino-azo compound obtainable by coupling a mono-diazo-diphenyl with a p-coupling primary amine of the benzene series, diazotising the said amino-azo compound on the cellulose ester or ether material, and coupling the diazo compound with a phenol of the benzene series.

3. Process for the coloration of cellulose acetate textiles which comprises impregnating the material with an amino azo compound obtainable by coupling a mono-diazo diphenyl with a p-coupling primary amine of the benzene series, diazotizing the said amino azo compound on the cellulose acetate textile and coupling the diazo compound with a hydroxy-diphenyl.

4. Process for the coloration of cellulose acetate textiles which comprises impregnating the material with an amino azo compound obtainable by coupling diazotized mono-acetylbenzidine with a p-coupling primary amine of the benzene series, diazotizing the said amino azo compound on the cellulose acetate textile and coupling the diazo compound with a hydroxy-diphenyl.

5. Cellulose ester or ether filaments, straws, foils or the like, colored with an azo dye obtainable by coupling a diazotized amino azo compound of the general formula $$R_1-N=N-R_2-NH_2$$

with a phenolic coupling component, $R_1$ being a radicle of which the aryl nuclei are selected from those of the benzene and naphthalene series and which consists of two of the said nuclei united by a single linkage, $R_2$ being a member of the group consisting of benzene and naphthalene radicles, and the phenolic coupling component being selected from the group consisting of mononuclear phenols, hydroxy-diphenyls and hydroxy-diphenylmethanes.

6. Cellulose acetate textile materials colored with an azo dye obtainable by coupling a diazotized amino azo compound of the general formula $$R_1-N=N-R_2-NH_2$$

with a phenolic coupling component, $R_1$ being a radicle of which the aryl nuclei are selected from those of the benzene and naphthalene series and which consists of two of the said nuclei united by a single linkage, $R_2$ being a member of the group consisting of benzene and naphthalene radicles, and the phenolic coupling component being selected from the group consisting of mononuclear phenols, hydroxy-diphenyls and hydroxy-diphenylmethanes.

7. Cellulose acetate textile materials, straws, foils or the like, coloured with an azo dye obtainable by coupling a phenol of the benzene series with a diazotised amino-azo compound obtainable from a diazo-diphenyl and a p-coupling primary amine of the benzene series.

8. Cellulose acetate textile materials colored with an azo dye obtainable by coupling an hydroxy-diphenyl with a diazotized amino azo compound obtainable from a mono-diazo diphenyl and a p-coupling primary amine of the benzene series.

9. Cellulose acetate textile materials colored with an azo dye obtainable by coupling a hydroxy-diphenyl with a diazotized amino azo compound obtainable from diazotized mono-acetylbenzidine and a p-coupling primary amine of the benzene series.

EDMUND STANLEY.
GEORGE HOLLAND ELLIS.
HENRY CHARLES OLPIN.